United States Patent
Stephenson et al.

[11] Patent Number: 5,835,809
[45] Date of Patent: Nov. 10, 1998

[54] FILTER FOR CORRECTING FOR FLUORESCENT LIGHT IN COLOR PRINTING

[75] Inventors: Stanley W. Stephenson, Spencerport; Philip J. LaRock, Henrietta, both of N.Y.

[73] Assignee: Eastman Kodak Company, Rochester, N.Y.

[21] Appl. No.: 872,275

[22] Filed: Jun. 10, 1997

[51] Int. Cl.[6] ............ G03B 29/00; G03B 17/50; H04N 5/30

[52] U.S. Cl. ............ 396/429; 396/374; 396/30; 358/909.1; 358/906

[58] Field of Search .................. 396/429, 374, 396/430, 30; 358/302, 906, 909.1, 296, 401, 501; 348/207, 373, 552, 839; 355/32

[56] References Cited

U.S. PATENT DOCUMENTS

| | | |
|---|---|---|
| 4,768,050 | 8/1988 | Beery . |
| 5,049,902 | 9/1991 | Duke . |
| 5,122,432 | 6/1992 | Hammann, IV . |
| 5,189,522 | 2/1993 | Stephenson, III ............ 396/429 |
| 5,493,409 | 2/1996 | Maeda et al. ............ 358/909.1 |
| 5,678,102 | 10/1997 | Chamberlain, IV ............ 396/429 |
| 5,715,234 | 2/1998 | Stephenson et al. ............ 396/429 |
| 5,715,492 | 2/1998 | Stephenson ............ 396/429 |
| 5,715,493 | 2/1998 | Stephenson ............ 396/429 |
| 5,742,861 | 4/1998 | Stephenson ............ 396/429 |
| 5,757,388 | 5/1998 | Stephenson ............ 396/429 |

OTHER PUBLICATIONS

P. 90 and p 273 of *Measuring Colour*, second edition, R.W.G. Hunt, Ellis Horwood Limited, 1991.

*Primary Examiner*—Safet Metjahic
*Assistant Examiner*—Michael Dalakis
*Attorney, Agent, or Firm*—Raymond L. Owens

[57] ABSTRACT

Apparatus for printing images from a liquid crystal display included within an image capture device including a source of fluorescent light; a liquid crystal display responsive to fluorescent light from the source for producing an image captured by the image capture device; a printer which includes photosensitive media which is adapted to be illuminated by the fluorescent light image from the liquid crystal display; and a filter disposed within the printer for correcting color error in the fluorescent light image prior to its illumination of the photosensitive media.

4 Claims, 3 Drawing Sheets

5,835,809

FILTER FOR CORRECTING FOR FLUORESCENT LIGHT IN COLOR PRINTING

FIELD OF THE INVENTION

The present invention relates correction for color error from liquid crystal displays in color printing.

BACKGROUND OF THE INVENTION

Prior applications have disclosed printing units that attach to the displays of electronic cameras. Such printers use the light emitted from the display to write to light sensitive media. The displays on such units must be energy efficient, and as a result such displays use a fluorescent illuminator to provide the white light for the display. Fluorescent lamps have irregular spectral emission, with very weak red light emission. Prints made using such light sources have poor color balance. Printing media are typically color balanced for conventional light sources. It would be advantageous to provide color correction means for such a printer that would not require special media.

SUMMARY OF THE INVENTION

It is an object of the present invention to make use of fluorescent lamps as a light source for a liquid crystal display used in a printer.

This object is achieved in an apparatus for printing images from a liquid crystal display included within an image capture device, comprising:

a) a source of fluorescent light;

b) a liquid crystal display responsive to fluorescent light from the source for producing an image captured by the image capture device;

c) a printer which includes photosensitive media which is adapted to be illuminated by the fluorescent light image from the liquid crystal display; and d) filtering means disposed within the printer for correcting color error in the fluorescent light image prior to its illumination of the photosensitive media.

ADVANTAGES

The invention permits correctly colored prints from images on electronic camera displays while using a normal fluorescent light source.

DETAILED DESCRIPTION OF THE INVENTION

The invention is directed to a compact printer used in conjunction with electronic cameras. Such cameras often have a flat panel color display that is used to frame and/or review capture images. Separable printers exist that receive data from said electronic capture devices. Typically, interface electronics are disposed in each device and data representing the image is transmitted from the electronic camera to the printer.

Figure 1:
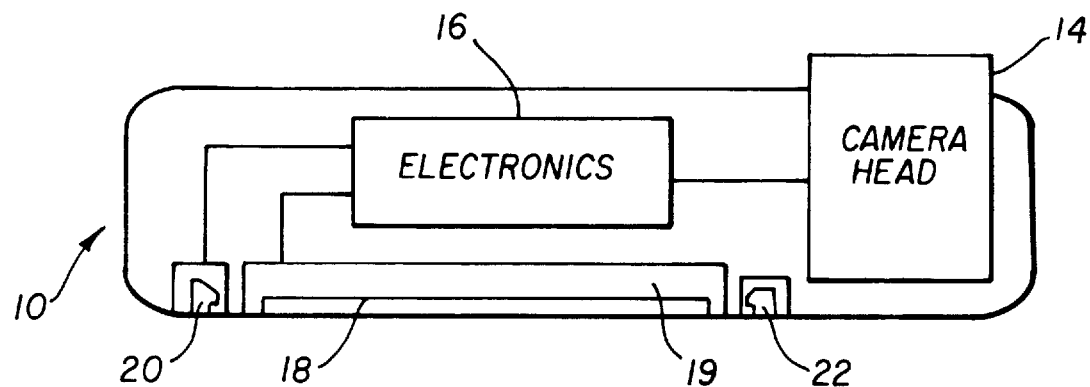
FIG. 1 is a top sectional view of an electronic camera which is adapted to be coupled to a printer in accordance with the present invention.
Figure 2:
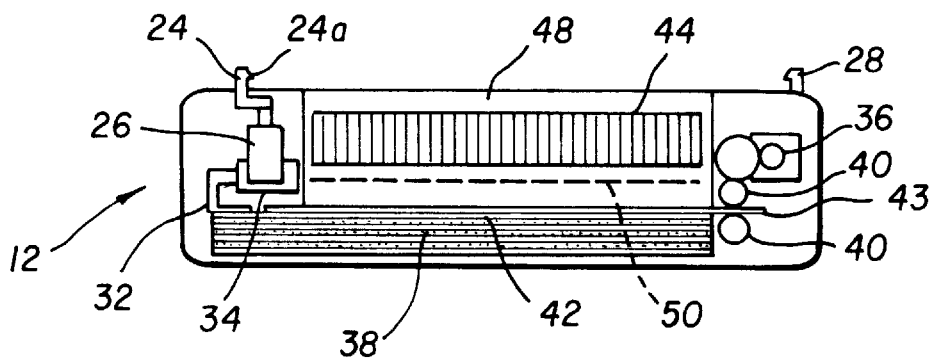
FIG. 2 is a top sectional view of the printer which is adapted to be coupled to the electronic camera of FIG. 1.

Turning now to FIG. 1, an electronic camera 10 is shown, and to FIG. 2, where a printer 12 is shown. Electronic camera 10 is of conventional design and can capture either still or motion images. The electronic camera being adapted to electronically store an image of a subject and having a camera display 18 for displaying such stored image. Images are captured by camera head 14 and transferred to camera electronics 16. Camera electronics 16 is capable of displaying still images on camera display 18. Camera display 18 can be, for instance, a LCD having a back-lit illuminator 19.

Illuminator 19 includes a fluorescent lamp of conventional design. These light sources are low power because they provide high levels of illumination at high efficiencies. The lamps contain low pressure mercury gas. When the gas is electrically excited, phosphors on the inside of the tube emit convert ultra-violet radiation emitted by the mercury gas into visible light. The phosphors are selected to provide light emission in the eye sensitive regions of red light (650 nm), green light (550 nm) and blue light (450 nm). The source of fluorescent light may be other than the traditional fluorescent lamp. It can include an array of microfluorescent emitters, for example.

The choice of different phosphors in fluorescent lamps is well known in the lamp making art. As shown in p 90 and p 273 of *Measuring Colour,* second edition, R. W. G. Hunt, Ellis Horwood Limited, 1991, there are normal phosphors labeled F1–F6, broad-band phosphors labeled F7–F9, and three-band phosphors labeled F10–F12. Certain blends of phosphors can be chosen; phosphors F1–F6 are currently used and they are efficient and inexpensive, but have poor color balance. An observer of these displays does not notice the color error because the human eye adapts to color variation. However, the human eye does notice the color error in prints made from such displays. The broad-band phosphors F7–F9 require more energy for a given light output, but have more uniform color balance. In other words, they have a much higher color rendering index. Currently, the most efficient lamps are used, which result in prints with poor color balance. Typically, these lamps are have excessive output in green light emission, resulting in bluish-green images. When the photosensitive media receives images which illuminate the liquid crystal display or other type of display, the media responds to the light source for which it has been designed.

Electronic camera 10, in accordance with the present invention, includes the additional modification of an active socket 20 and a passive socket 22 for the purpose of securing the printer 12 over camera display 18. Active socket 20 incorporates electronic sensing circuitry to communicate with printer 12. Electronic sensing circuitry can be an electrical interconnection between active socket 20 and camera electronics 16. Alternatively, a light sensing/transmitting assembly can be incorporated in or near the active socket 20.

Figure 5:
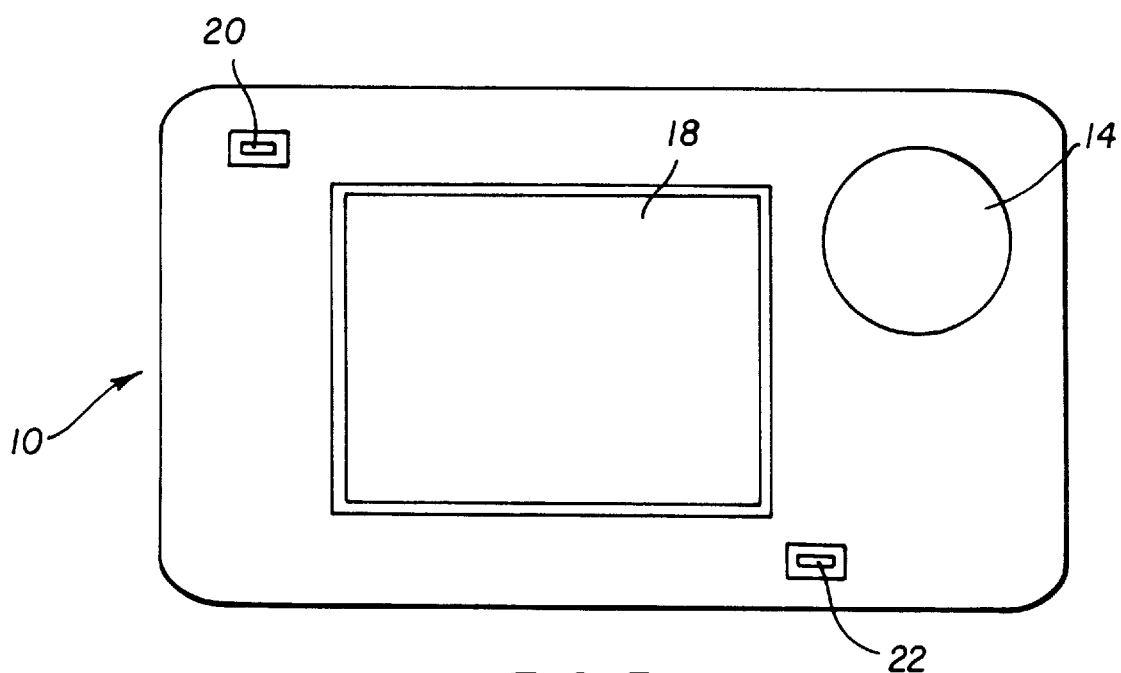
FIG. 5 is the back of the electronic camera in FIG. 1 according to the present invention.

The printer 12 includes a light tight storage structure for receiving a stack of photosensitive sheets disposed relative to a camera opening as will be described shortly. The printer 12 has an active latch 24 and a passive latch 28 that permits the printer to be secured over the camera display 18. In this embodiment the latches 24 and 28 are hooked by matching detail 24a to sockets 20 and 22 of electronic camera 10. The rear view of the camera in FIG. 5 shows the position of the active socket 20 and the passive socket 22 and camera display 18. A latch driver 26 permits the selective securing and release of printer 12 from electronic camera 10 under control of printer electronics 30. A compliant, light tight mask is disposed on the printer 12 and forms a light tight interconnection to camera display 18.

Figure 3:
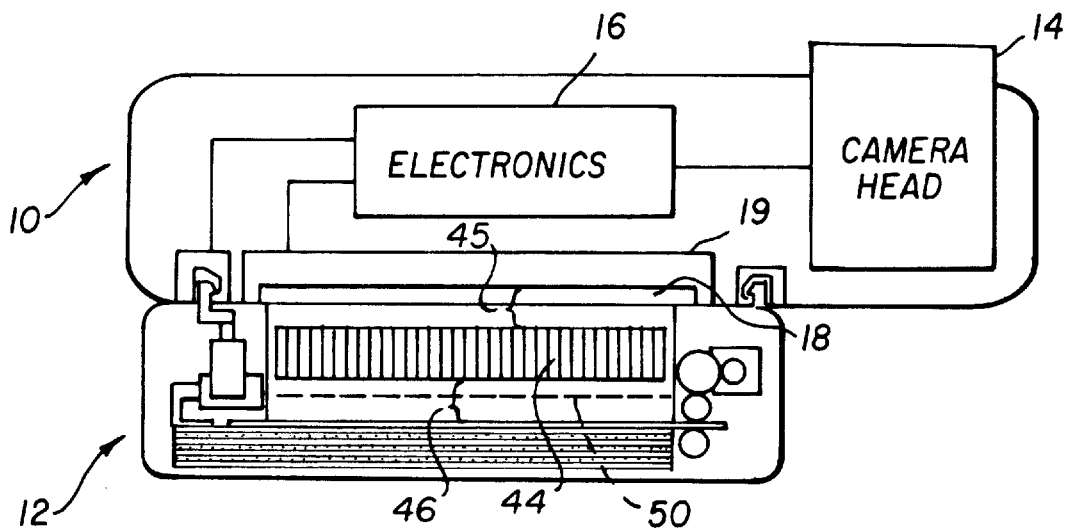
FIG. 3 shows the printer of FIG. 2 attached to the camera of FIG. 1.
Figure 4:
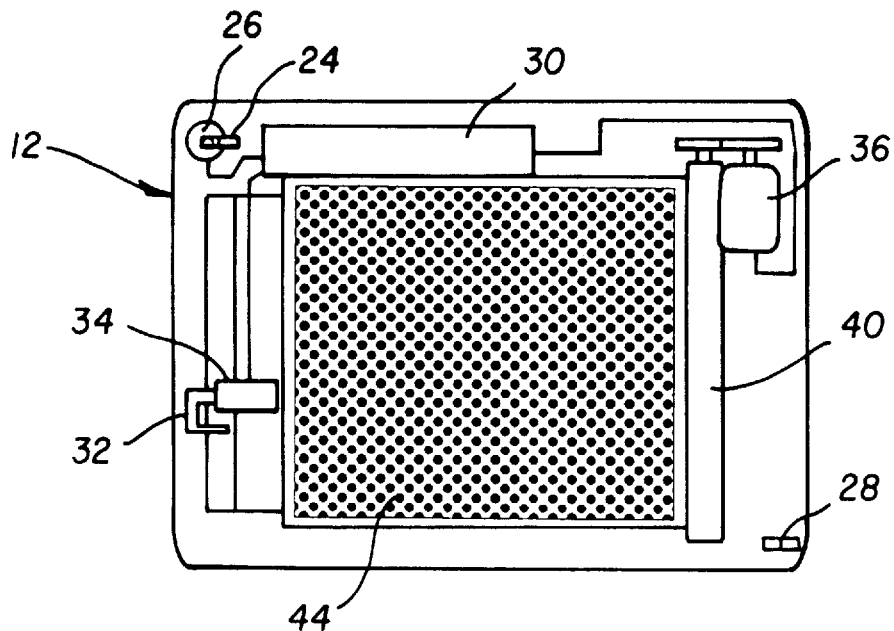
FIG. 4 is a front sectional view showing portions of the printer of FIG. 2.

FIG. 3 shows printer 12 secured to electronic camera 10. The printer 12 contains a stack of media sheets 38. These sheets are light sensitive and are loaded into the camera and stored in light sensitive manner as is known in the art. Photosensitive sheets can be found in current art as instant silver-halide sheets or pressure sensitive microencapsulated crushable color particles such as disclosed in U.S. Pat. Nos. 4,768,050, 5,049,902, and 5,122,432. Alternatively, images can be stored on photographic film and then stored and chemically processed at a later time. Media using these systems are typically sensitized to have a uniform response across the visible spectrum. Correspondingly, light used to print on said media should have a uniform intensity across the visible spectrum.

Figure 6:
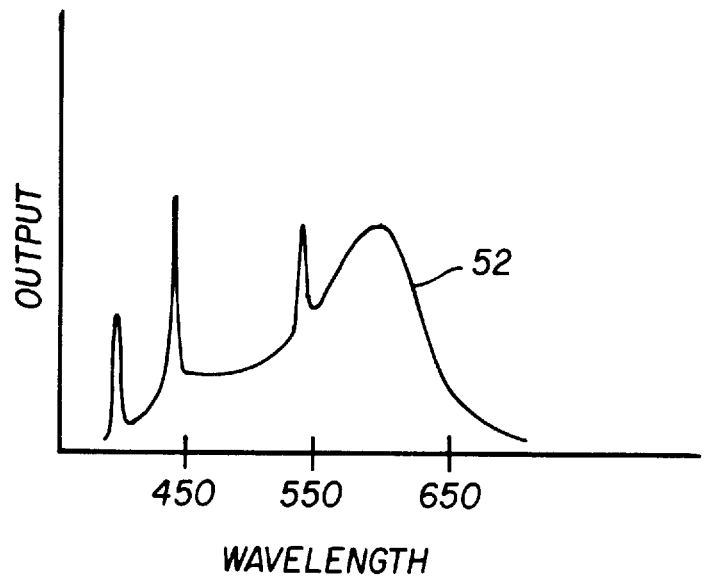
FIG. 6 is a graph of the spectral distribution of light from a typical display illuminator.
Figure 7:
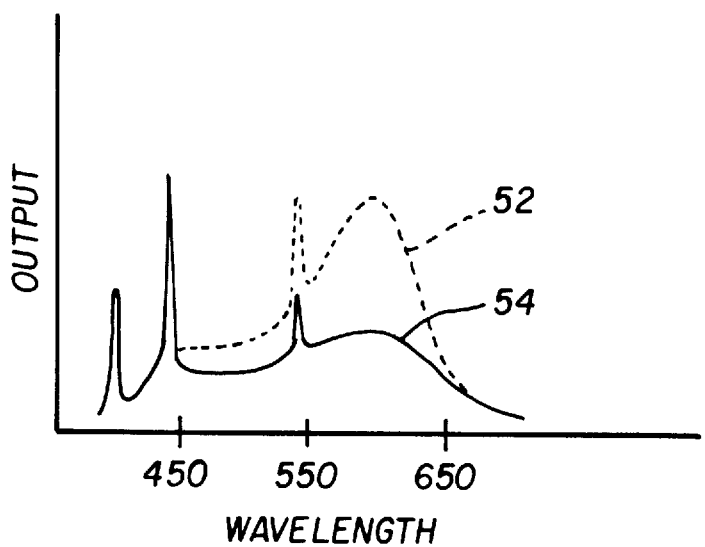
FIG. 7 is a graph of the spectral distribution of light at the photosensitive sheet according to the present invention.

In this invention, a color filter 50 is disposed in printer 12 so that light from camera display 18 is color balanced for the color error induced by display illuminator 19 which uses normal phosphors. FIG. 6 is a graph which shows light energy output 52 from a normal phosphor fluorescent lamp. FIG. 7 shows the effect of color filter 50 which reduces the intensity of the blue and green light so that the filtered light intensity 54 across the visible spectrum matches the sensitivity of photosensitive media 42. Application of the filter provides color corrected prints of the image on camera display 18. This embodiment provides for color balanced images in a printer attachable to an electronic camera. A 60 unit Color Compensating (CC) magenta color filter has been found to be quite effective for correcting for fluorescent light images. In one example actually conducted with a display from a Kodak DC25 camera, the display was illuminated by a standard fluorescent light source and a 60 unit CC magenta color filter interposed between color photographic film and the illuminated display. Images were produced which were found to be more esthetically pleasing than without the filter. The reason being is that the magenta filter corrected the light image so that it produced a more correct color balanced image because it corrects for excessive green color. The degree of filtration to create daylight balanced images is very high. Incorporating such a filter in the camera would require significantly increased power to create sufficient light from the lamp. In addition, the user would not notice the change in color on the display. By incorporating the filter in an attachable printer, the power demand on the camera is reduced while providing color balanced images on an attachable printer.

Light from the camera display 18 passes through a printer opening 48 passes through filter 50 and falls onto media sheets 38. Media sheets 38 (shown in FIG. 2 and 3) include interleaved sheets of a first cover sheet 43 which lies on top of a matching photosensitive sheet 42 to prevent exposure of an underlying photosensitive sheet. Each cover sheet 43 is light opaque, and has physical characteristics similar to photosensitive sheet 42 to permit a common pick/processor to operate on both types of sheets.

After exposure of photosensitive sheet 42, picker 32 is moved by picker drive 34 to urge photosensitive sheet 42 into processing rollers 40. Processing rollers 40 are driven by roller drive 36 under control of printer electronics 30.

Printing optic 44 is used to focus an image onto photosensitive sheet 42. The printing optic 44 focuses a display area from the camera display 18 onto a photosensitive surface of the sheet 42 nearest the camera display 18. Printing optic 44 can be an array of gradient index rods that have been formed into a two dimensional array. Printing optic 44 can be formed from Nippon Sheet Glass rod lens array type 20B which has a total conjugate 15.1 mm. The actual element is 6.89 mm tall and is positioned to provide a focused image from camera display 18 to the imaging surface of photosensitive sheet 42.

The sockets and latches are dimensionally controlled to align printing optic 44 with the light emitting elements of camera display 18. First working distance 45 should be located by the interface to focus on the light emitting elements of camera display 18. Second working distance 46 is provided for forming an image on the imaging surface of photosensitive sheet 42 as it lies on platen 35. Printing optic 44 is accurately positioned relative to the display when the printer is secured to the electronic camera 10.

Signals from printer electronics 30 are transmitted through an interface formed by active latch 24 and active socket 20. The control signals are received by camera electronics 16. Camera electronics 16 turns camera display on and off under the control of printer electronics 30. Printer electronics 30 turns off the display and operates picker drive 34 to move cover sheet 43 into processing rollers 40. Roller drive 26 is then activated to eject cover sheet 43 from printer 12. This action leaves photosensitive sheet 42 exposed to darkened camera display 18. Further signals from printer electronics 30 cause camera electronics 16 to reactivate camera display 18. A third transmission turns camera display 18 off to prevent further exposure of photosensitive sheet 42. After exposure, photosensitive sheet 42 is urged by picker 32 into processing rollers 40. Processing rollers 40 are turned by process roller drive 36 to process the latent image formed on photosensitive sheet 42. An underlying cover sheet 43 allows printer 12 to be detached without accidental exposure of other photosensitive sheets 42.

In the case of silver halide imaging, a pod of chemicals at the beginning of photosensitive sheet 42 is burst by processing rollers 40. The chemicals are spread across the image of photosensitive sheet 42 as photosensitive sheet 42 passes through processing rollers 40. Said chemicals operate on the latent image to create a permanent colored dye image on photosensitive sheet 42. In the case of crushable media, the rollers apply pressure to micro-beads containing the latent image. Burst micro-beads release dye chemistries onto photosensitive sheet 42 to create a permanent color image.

In FIG. 3, an operator has mounted printer 12 onto electronic camera 10. Latches 24 and 28 automatically secure printer 12 in a light tight manner to camera display 18 on electronic camera 10. The operator signals the start of printing using printer electronics 30. Printer 12 signals camera electronics 16 to turn off camera display 18. Printer electronics 30 then activates picker drive 34 to urge cover sheet 43 into processing rollers 40. Roller drive 36 is activated to eject cover sheet 43 from printer 12, leaving photosensitive sheet 42 exposed to camera display 18. Sensors (not shown) detect that cover sheet 43 has been ejected. Printer electronics 30 then signals camera electronics 16 turn camera display 18 on for a time period providing proper exposure of photosensitive sheet 42. Printer electronics 30 is aware of the light sensitivity of photosensitive sheet 42 and sets exposure time correspondingly.

After exposure of photosensitive sheet 42, camera display 18 is off. Picker 32 moves under the actuation of picker drive 34 to move photosensitive sheet 42 into rotating processing rollers 40. Processing rollers 40 grip and drive photosensitive sheet 42 out of printer 12, providing the operator with a permanent color record of camera display 18.

The use of the latch driver 26 under the control of printer electronics 30 ensures that printer 12 is not detached from electronic camera 10 during image transmission from camera display 18. An operator detaches printer 12 from electronic camera 10 using an interface to printer electronics 30 such as a conventional switch. Printer electronics 30 then activates latch driver 26 to permit removal of printer 12 from electronic camera 10.

In operation, the active socket 20 provides communication between the electronic camera and the printer so that the display image is imaged onto the photosensitive sheet after the shutter member 50 is moved from its first to its second position. After film exposure, the shutter member 50 is returned to its first covering position.

The invention has been described in detail with particular reference to a certain preferred embodiment thereof, but it will be understood that variations and modifications can be effected within the spirit and scope of the invention. Variations and modifications can be effected within the spirit and scope of the invention.

PARTS LIST

| | |
|---|---|
| 10 | electronic camera |
| 12 | printer |
| 14 | camera head |
| 16 | camera electronics |
| 18 | camera display |
| 19 | display illuminator |
| 20 | active socket |
| 22 | passive socket |
| 24 | active latch |
| 24a | detail |
| 26 | latch driver |
| 28 | passive latch |
| 30 | printer electronics |

PARTS LIST -continued

| | |
|---|---|
| 32 | picker |
| 34 | picker drive |
| 36 | roller drive |
| 38 | media sheets |
| 40 | processing rollers |
| 42 | photosensitive sheet |
| 43 | cover sheet |
| 44 | printing optic |
| 48 | printer opening |
| 50 | color filter |
| 52 | original intensity |
| 54 | filtered intensity |

What is claimed is:

1. Apparatus for printing images from a liquid crystal display included within an image capture device, comprising:
   a) a source of fluorescent light;
   b) a liquid crystal display responsive to fluorescent light from the source for producing an image captured by the image capture device;
   c) a printer which includes photosensitive media which is adapted to be illuminated by the fluorescent light image from the liquid crystal display; and
   d) filtering means disposed within the printer for correcting color error in the fluorescent light image prior to its illumination of the photosensitive media.

2. The apparatus of claim 1 wherein the color filter corrects the light image to provide a more color balanced image.

3. The apparatus of claim 2 wherein the color filter is a magenta filter.

4. The apparatus of claim 3 wherein the magenta filter is a 60 unit Color Compensating filter.

\* \* \* \* \*